(12) United States Patent
Kani et al.

(10) Patent No.: US 12,101,321 B2
(45) Date of Patent: Sep. 24, 2024

(54) CONFIGURING INSTANCES WITH INSTANCE METADATA STORED IN VIRTUAL SECURITY PROCESSORS

(71) Applicant: HEWLETT PACKARD ENTERPRISE DEVELOPMENT LP, Houston, TX (US)

(72) Inventors: Toshimitsu Kani, Ft. Collins, CO (US); Benjamin D. Lytle, Nashville, TN (US); Clark T. Laughlin, Houston, TX (US); Robert C. Elliot, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 209 days.

(21) Appl. No.: 17/588,969

(22) Filed: Jan. 31, 2022

(65) Prior Publication Data

US 2023/0247023 A1 Aug. 3, 2023

(51) Int. Cl.
*H04L 29/06* (2006.01)
*H04L 9/40* (2022.01)

(52) U.S. Cl.
CPC .............. *H04L 63/10* (2013.01); *H04L 63/20* (2013.01)

(58) Field of Classification Search
CPC ....... H04L 63/10; H04L 63/20; H04L 63/123; H04L 63/0263; H04L 63/12; H04L 63/08

USPC ............................................................ 726/5
See application file for complete search history.

(56) References Cited

U.S. PATENT DOCUMENTS

| | | | |
|---|---|---|---|
| 7,613,921 B2 | 11/2009 | Scarlata | |
| 7,636,442 B2 | 12/2009 | Scarlata | |
| 8,074,262 B2 | 12/2011 | Scarlata | |
| 8,549,288 B2 | 10/2013 | Bade | |
| 8,595,483 B2 * | 11/2013 | Rozas | G06F 21/57 726/16 |
| 9,081,600 B2 | 7/2015 | Mackintosh | |
| 9,202,062 B2 * | 12/2015 | Mackintosh | G06F 9/45558 |
| 9,288,155 B2 | 3/2016 | Keitaro | |
| 9,519,787 B2 | 12/2016 | Novak | |
| 2019/0207764 A1 | 7/2019 | Maximov et al. | |
| 2021/0271502 A1 | 9/2021 | Elliot | |

FOREIGN PATENT DOCUMENTS

WO 2018054466 3/2018

\* cited by examiner

*Primary Examiner* — Longbit Chai
(74) *Attorney, Agent, or Firm* — Trop, Pruner & Hu, P.C.

(57) ABSTRACT

Responsive to a start-up of an instance of a cloud-based computing environment, metadata that is stored in a virtual trusted platform module (vTPM) is accessed. The metadata represents configuration parameters for the instance, and the configuration parameters include a security credential. The instance is configured based on the metadata. The configuration includes configuring an access control of the instance with the security credential.

19 Claims, 7 Drawing Sheets

NON-TRANSITORY MACHINE-READABLE STORAGE MEDIUM

MACHINE-EXECUTABLE INSTRUCTIONS THAT, WHEN EXECUTED BY MACHINE, CAUSE MACHINE TO:

- IN RESPONSE TO STARTUP OF INSTANCE OF CLOUD-BASED COMPUTING ENVIRONMENT, ACCESS METADATA STORED IN VIRTUAL TRUSTED PLATFORM MODULE (vTPM), WHERE METADATA REPRESENTS CONFIGURATION PARAMETERS FOR INSTANCE, AND CONFIGURATION PARAMETERS INCLUDE SECURITY CREDENTIAL
- CONFIGURE INSTANCE BASED ON METADATA, INCLUDING CONFIGURING ACCESS CONTROL OF INSTANCE WITH SECURITY CREDENTIAL

CONFIGURING INSTANCES WITH INSTANCE METADATA STORED IN VIRTUAL SECURITY PROCESSORS

BACKGROUND

A computer system may be subject to a security attack in which a rogue entity seeks to access information that is stored on the computer system or harm components of the computer system. For purposes of preventing security attacks or at least inhibiting the degree of potential harm inflicted by security attacks, the computer system may have different levels of protection. For example, the computer system may have various mechanisms to limit access, such as firewalls, passwords, keys, and so forth. As another example, a computer system may have a secure cryptographic processor (or "security processor"), such as a trusted platform module (TPM), which may provide a number of security-related features for the computer system. The security-related features may, for example, be used to store secrets (e.g., keys, passwords, certificates and so forth), be used to ensure that the computer system consistently behaves in expected ways, and be used to prove that the computer system is trustworthy.

DETAILED DESCRIPTION

A cloud computing system may include multiple physical server nodes (e.g., blade servers or rack mounted servers), or "computer platforms," which are managed by a central management subsystem of the cloud computing system. In general, the central management subsystem orchestrates a software-defined logical infrastructure and services (e.g. software-defined compute (SDC) services, software-defined storage (SDS) services and software-defined networking (SDN) services), which are hosted on the computer platforms. As part of providing the logical infrastructure and services, the computer platforms may provide machine instances.

A "machine instance," as used herein, refers to a case or occurrence of a computing environment. The "computing environment" may refer to an abstraction or virtualization of actual hardware and software resources, i.e., the computing environment may be a virtual computing environment. The "computing environment" may refer to a set of actual hardware and software resources, i.e., the computing environment may be a bare metal computing environment. The hardware and software resources for a given computing environment may include, as examples, an operating system instance, one or multiple application instances, one or multiple central processing units (CPUs), one or multiple graphics processing units (GPUs), memory, network interface controllers, persistent storage and so forth.

A virtual machine instance is an example of a machine instance that may be considered to be a case or occurrence of a virtual computing environment. A virtual machine instance (also called a "guest virtual machine," a "virtual machine, a "VM instance," a "guest VM," or a "VM" herein) refers to a machine level abstraction of hardware and software resources. A virtual machine monitor (VMM), or hypervisor, of a computer platform, provides the abstraction of hardware and platform resources for the virtual machine instance, and the hypervisor provides isolation among multiple virtual machine instances of the compute platform. Moreover, the hypervisor may manage the lifecycles (e.g., the starting and termination) of the respective virtual machine instances. A virtual machine instance contains a guest operating system that is an abstraction of the actual host operating system that is installed on the computer platform. As such, the guest operating system does not have direct access to the underlying hardware of the host computer platform. The hardware and software resources available for a given virtual machine instance depends on the specifics of the subscription of the associated cloud tenant.

A bare metal instance is an example of a machine instance that may be considered to be a case or occurrence of a bare metal computing environment, i.e., an environment corresponding to a dedicated set of actual hardware and software components of the host computer platform. The operating system of a bare metal instance has access to underlying hardware of the host computer platform. It is noted that a bare metal instance may not have access to all of the hardware and/or software resources of the host computer platform, but instead, the bare metal instance may be limited in scope to specific hardware and/or software resources, depending on the specifics of the subscription of the corresponding cloud tenant.

Deploying a machine instance to a given computer platform (i.e., cloud domain node) may involve deploying a generic operating system image to the platform and subsequently executing a start-up program (e.g., a cloud-init script) when the machine instance first boots, for purposes of specifically configuring the operating system image. The start-up program configures the operating system image with instance-specific information and user-specific information. As examples, the instance-specific information may include such attributes as an identification of a type, or category, of the machine instance; an identity of a virtual device that contains the root file system; an availability zone of the machine instance; an Internet Protocol (IP) address of the machine instance; and so forth. The user-specific information contains, among other possible information, a user-selected credential (e.g. a Secure Shell SSH) key), which allows the user to securely communicate (e.g., communicate via an SSH tunnel) with the machine instance.

The start-up program may retrieve metadata (called "instance metadata" herein) that represents instance-specific information and user-specific information, which the start-up program uses to configure the operating system image. One approach to retrieve the instance metadata involves the start-up program using the hypertext transfer protocol (HTTP) to retrieve the instance metadata from a designated IP address. As a security measure, the server corresponding to the designated IP address may limit access to the instance metadata to the machine instance. Because the start-up program acts through its machine instance, the server allows the start-up program to retrieve the instance metadata.

Even with access to the instance metadata being limited to the machine instance, a rogue entity may circumvent this security measure by acting through the machine instance to gain access to the instance metadata (and thus, gain access to sensitive user information). For example, the machine instance may provide a graphical user interface (GUI), which may have a Uniform Resource Locator (URL) address field, which is supposed to be used to specify URLs for uploads to the GUI. A rogue entity may be entered in an URL field of the GUI to cause the GUI to upload and expose the instance metadata (including exposing sensitive user credentials). The security measures for accessing the instance metadata may be further hardened by limiting the access to a token (e.g., a token created by a client URL (cURL) PUT command) that is generated for a particular session. Therefore, retrieval of the instance metadata is limited to a request (e.g., a request with the cURL GET command) that contains the generated token. However, this approach to securing the instance metadata may still be vulnerable due to the communication of the instance metadata occurring over an unsecure HTTP connection.

Another approach to protect instance metadata is for a machine instance to first boot from an operating system installer that is running on a random access memory (RAM)-based file system. The operating system installer installs a selected operating system image to the root device, and the operating system installer obtains the instance metadata and uses it to configure the operating system image. This approach may, however, take a significant time to set up a new machine instance. Moreover, the root device cannot be reattached to other instances without additional operating system image setups.

In accordance with example implementations, start-up program executes on a first boot of a machine instance to configure a generic operating system image of the machine instance with instance-specific information and user-specific information. The start-up program, in accordance with example implementations, retrieves instance metadata (that contains the instance-specific information and user-specific information) from a virtual security processor, such as a virtual trusted platform module (vTPM).

More specifically, in accordance with example implementations, a controller of a computer platform (which provides the machine instance) creates a vTPM; provisions the vTPM with the instance metadata; and attaches the vTPM to the machine instance. The controller may perform the creation, provisioning and attachment of the vTPM in accordance with requests that are provided by a cloud orchestrator. When the machine instance starts, a start-up program (e.g., a script) of the machine instance accesses the attached vTPM to retrieve the instance metadata, and the start-up program uses the retrieved instance metadata to set up, or configure, the operating system image that is associated with the machine instance.

In accordance with example implementations, the controller may create a persistent memory image (e.g., an non-volatile random access memory (NVRAM) image, such as a TPM NVRAM image) for the vTPM. The persistent memory image, among other possible data, contains the instance metadata. The controller may communicate the created persistent memory image to the cloud orchestrator so that the cloud orchestrator may maintain the persistent memory image as a source of trust. The controller may also maintain a local cache copy of the persistent memory image.

Due to the cloud orchestrator maintaining the persistent memory image as a source of trust, the local cache copy that is stored on the computer platform may be deleted when the machine instance stops, and the vTPM is detached from the machine instance. Moreover, the controller may readily restore the local cache copy from the source of trust in the event that the machine instance restarts and is reattached to the vTPM. Also, because the persistent memory image is maintained as a source of trust off the computer platform, user updates (e.g., additional keys installed by the user) to the vTPM may be maintained over the lifecycle of the vTPM (i.e., maintained from the creation of the vTPM to the deletion of the vTPM, regardless of the number of times that the vTPM is detached from a machine instance). Additionally, as further described herein, due to the persistent memory image being available from the source of trust, the controller may readily update the persistent memory image (e.g., update the persistent memory image with new instance metadata) when migrating the vTPM from one machine instance to another machine instance.

Figure 1:
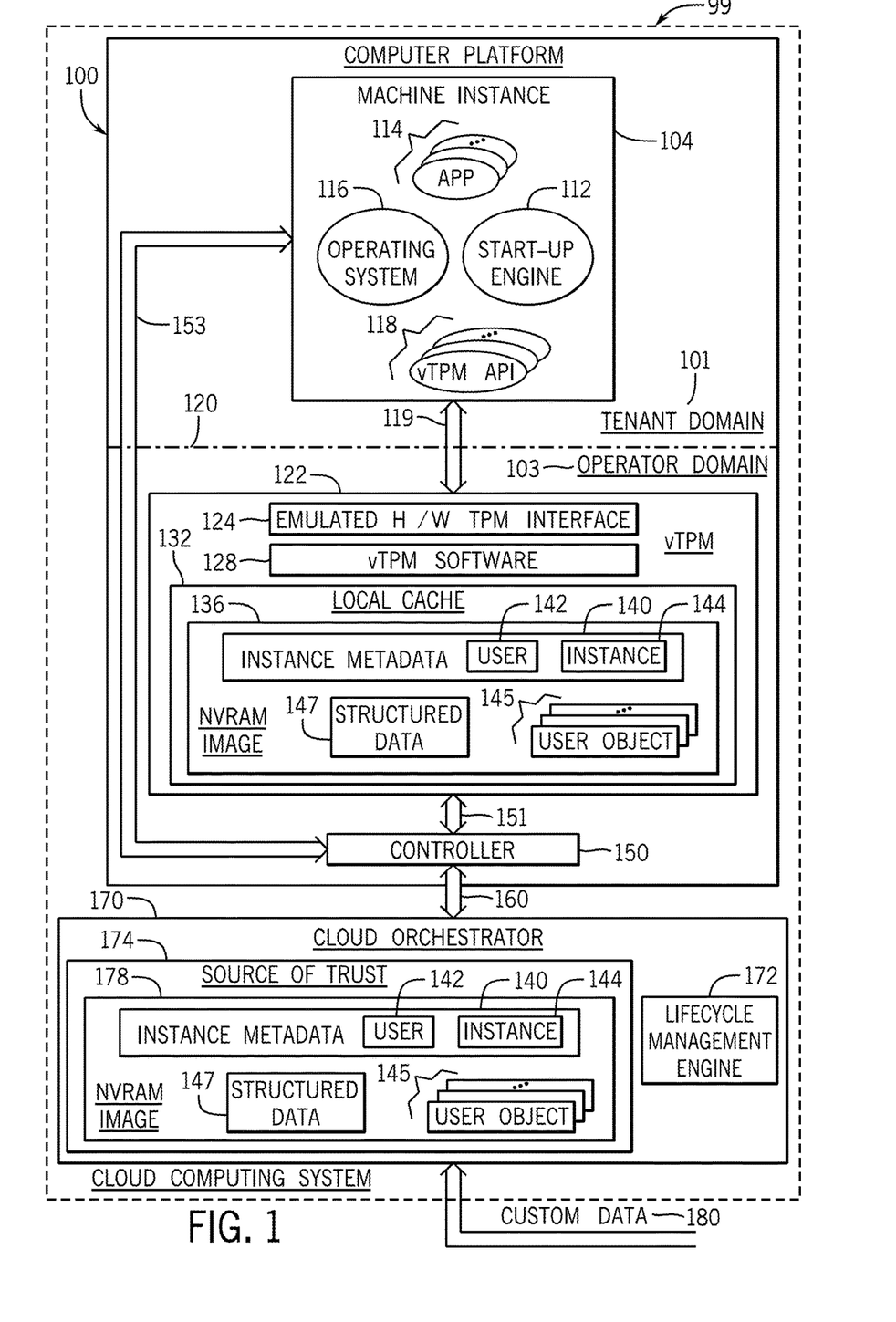
FIG. 1 is schematic diagram of a cloud computing system having a computer platform that includes a virtual trusted platform module (vTPM) that stores instance metadata used to configure a machine instance according to an example implementation.

Referring to FIG. 1, as a more specific example, in accordance with some implementations, a cloud computing system 99 includes one or multiple computer platforms 100 that form corresponding domain nodes of a cloud computing system 99. In this context, a "computer platform" refers to a modular unit, which includes a frame, or chassis. Moreover, this modular unit may include hardware that is mounted to the chassis and is capable of executing machine-executable instructions. A blade server is an example of the computer platform 100, in accordance with an example implementation. The computer platform 100 may, however, be any of number of different platforms other than a blade server, in accordance with further implementations, such as a rack-mounted server, a client, a desktop, a smartphone, a laptop computer, a tablet computer, a modular switch, storage array, a cluster node, and so forth.

The computer platform 100 has a cloud tenant domain 101 and a cloud operator domain 103, which are separated by the illustrated boundary 120. Cloud tenant software executes inside the cloud tenant domain 101. For the example implementation that is depicted in FIG. 1, the cloud tenant domain 101 includes one or multiple machine instances 104 (e.g., virtual machine instances and/or bare metal instances). In accordance with example implementations, a machine instance 104 may be associated with a particular cloud tenant and be associated with software that is executed to provide one or multiple cloud services for the cloud tenant. For the example implementation that is depicted in FIG. 1, the machine instance 104 includes an operating system 116 and applications 114. The software may also include one or multiple virtual trusted platform module (vTPM) application programming interfaces (APIs) 118 and a start-up engine 112, which are further described herein.

The cloud operator domain 103 of the computer platform 100 includes a cloud orchestrator 170 that manages hardware and software components of the cloud operator domain 103. The cloud orchestrator 170, in accordance with some implementations, may include one or multiple servers, and the cloud orchestrator 170 may be connected by a network fabric connection 160 (i.e., a connection 160 including network fabric, which may include one or multiple network components, one or multiple network protocols, and so forth).

The cloud orchestrator 170, in accordance with example implementations, includes a lifecycle management engine 172 that manages the lifecycles of machine instances 104 that may be deployed on domain nodes of the cloud computing system 99, such as the computer platform 100. In this context, the managing the lifecycle of a machine instance 104 includes managing, or controlling, the life stages of the machine instance 104. As examples, a particular machine instance 104 may, under the management of the lifecycle management engine 172, transition through multiple lifecycle stages, such as a provisioning stage (i.e., a stage to allocate resources for the machine instance 104) and a staging stage (i.e., a stage in which the machine instance 104 prepares for its first boot, or start up). The machine instance lifecycle stages may also include a running stage, a stopping stage in which the machine instance 104 is the process of being stopped, a termination stage, and so forth. In accordance with example implementations, the lifecycle management engine 172 is formed by one or multiple processing cores (e.g., CPU cores or GPU cores) on one or multiple servers executing machine-readable instructions (or "software").

In accordance with example implementations, the lifecycle management engine 172 may manage the lifecycles of vTPMs, such as example vTPM 122, that are created on computer platforms. The vTPM 122 is located in the cloud operator domain 103. As further described herein, the lifecycle of the vTPM may include a provisioning stage to create a vTPM, such as vTPM 122, including allocating resources of the cloud orchestrator 170 and computer platform 100. The lifecycle of the vTPM may include an attachment stage in which a vTPM is attached to a machine instance, such as machine instance 104. Moreover, the lifecycle of the vTPM may include a detachment stage in which the vTPM is detached from a machine instance and resources on the computer platform 100 for the vTPM are deallocated (e.g., deleted or erased). The lifecycle of the vTPM may further include a deletion stage in which all resources for the vTPM are deallocated to delete the vTPM (e.g., resources on the cloud orchestrator 170 are deleted, or erased). The lifecycle of the vTPM may further include a migration stage in which a vTPM is moved, or migrated, from one machine instance (e.g., a virtual machine instance that has failed or is on a first computer platform) to another machine instance (e.g., a virtual machine instance on the same, first computer platform or another computer platform).

In accordance with example implementations, the lifecycle management engine 172 communicates with a controller 150 of the computer platform 100 to create machine instances (such as example machine instance 104) on the computer platform 100 and manage the lifecycles of the machine instances. Moreover, in accordance with example implementations, the lifecycle management engine 172 may communicate with the controller 150 to create vTPMs (such as example vTPM 122) and attach, or associate, the vTPMs to the machine instances. For the example implementation that is depicted in FIG. 1, the vTPM 122 is attached to the machine instance 104 (as depicted at reference numeral 119). The "attachment" of a vTPM to a particular machine instance, in this context, refers to the vTPM being accessible to entities of the machine instance (as controlled by access policies, as further described herein).

The following discussion refers specifically to the vTPM 122 and the machine instance 104 that are depicted in FIG. 1, although it is understood that, in accordance with example implementations, the computer platform 100 may have multiple machine instances and multiple vTPMs. Moreover, in the following discussion, the cloud orchestrator 170 performing an action generally encompasses the action being performed by a component of the cloud orchestrator 170 (such as the lifecycle management engine 172).

For the following discussion, it is assumed that the controller 150 manages the lifecycles of the vTPM 122 in response to requests from the cloud orchestrator 170. Moreover, in accordance with example implementations, the controller 150 manages the lifecycle of the machine instance 104 responsive to requests from the cloud orchestrator 170. In accordance with some implementations, as further described herein, the controller 150 may include more than one component, such as a hypervisor to manage the lifecycles of machine instances and a platform controller to manage the lifecycles of vTPMs. In accordance with further example implementations, the controller 150 may be a single entity, such as a hypervisor, which manages the lifecycles of machine instances and manages the lifecycles of vTPMs.

As indicated at reference numeral 153, in accordance with example implementations, the controller 150 performs the on-platform management of the lifecycle of the machine instance 104 (as directed by the cloud orchestrator 170). Moreover, as indicated at reference numeral 151, in accordance with example implementations, the controller 150 performs the on-platform management of the lifecycle of the vTPM 122 as directed by the cloud orchestrator 170). The cloud orchestrator 170, in accordance with example implementations, as part of a process to set up the configuration of the machine instance 104, communicates with the controller 150 to create the vTPM 122. As part of the creation of the vTPM 122, the controller 150 provisions the vTPM 122 with instance metadata 140. As further described herein, for purposes of creating the vTPM 122, the cloud orchestrator 170 may receive custom data 180 from a cloud tenant (e.g., receive the data 180 via a GUI associated with the cloud orchestrator 170 or receive the data 180 via a file communicated to the cloud orchestrator 170 by the could tenant), and the custom data 180 may include data representing parameters or attributes of the instance metadata 140.

In accordance with example implementations, the instance metadata 140 contains user-specific metadata 142 and instance-specific metadata 144. When the machine instance 104 starts up for the first time, the start-up engine 112 (e.g., a script, such as a cloud-init script, that is executed by a processing core of the computer platform 100) accesses the vTPM 122 to retrieve the instance metadata 140. The start-up engine 112 then proceeds to configure an image of an operating system 116 of the machine instance 104 based on the instance metadata 140. For example, based on the instance metadata 140, the start-up engine 112 may configure the operating system image with instance-specific information, such as an identifier of the machine instance 104, an identity of a virtual device that contains the root file system, a host name of the machine instance 104, an IP address of the machine instance 104, the availability zone of the machine instance 104, and so forth. The start-up engine 112, based on the instance metadata 140, may configure the operating system image with user-specific information, such as an SSH key or another user credential, which allows a user to securely communicate with the machine instance 104.

The vTPM 122 is an example of a virtual secure cryptographic processor, or "virtual security processor." In general, a security processor (whether an actual physical security processor or a virtual security processor) may provide trusted computing operations for a computer platform for purposes of ensuring that the computer platform consistently behaves in expected ways. As examples of trusted computing operations, the security processor may generate cryptographic keys; store security artifacts (e.g., cryptographic keys and certificates); access security artifacts; erase security artifacts; store integrity measurement digests; provide signed integrity measurement digests for remote attestation; encrypt data; decrypt data; seal cryptographic keys to certain integrity measurement digest states (e.g., bind a key encryption key (KEK) of a storage device to a set of integrity measurements); unseal cryptographic keys; provide nonces for cryptographic communications; sign certificates; provide random or pseudorandom numbers; and so forth. The trusted computing operations may also include operations to configure the security processor and operations to own the security processor. A trusted platform module, or "TPM," is an example of a security processor.

The security processor, in accordance with example implementations, may have a non-volatile, or persistent, memory, such as a non-volatile random access memory (NVRAM), for purposes storing two types of data: predefined data structures (e.g., structures corresponding to an endorsement key (EK), an attestation key (AIK), seeds, authorization values, and so forth); and unstructured data. The data stored in the NVRAM may be referred to as an "NVRAM image" (or "persistent memory image"). The structured data may be defined by an architectural standard for the security processor, and the unstructured data corresponds to user objects (e.g., cryptographic keys, passwords, seeds, sensitive data, and so forth) that may be accessed (read or stored) by a tenant if the tenant complies with the corresponding access control policies for the user objects.

As an example, a particular user object may be a hard disk encryption key that has the following access control policy. Access to the hard disk encryption key may be limited to tenant(s) having the proper privilege level. Moreover, the access may be limited to tenant(s) with knowledge of the associated handle, or "NV index," of the user object. In addition to the tenant having the appropriate privilege level and possessing the NV index, the access control policy may further specify additional criteria. For example, according to its associated access control policy, the hard disk encryption key may be sealed to a measurement digest, such as a measurement digest that is represented by platform configuration registers (PCRs) of the computer platform. Here, the hard disk encryption key being "sealed" refers to the key being encrypted. The hard disk encryption key may be sealed to a particular state of the computer platform (or other state), such that the security processor does not otherwise unseal, or decrypt, the hard disk encryption key and provide the hard disk encryption key to the requesting tenant if the current measurement digest (e.g., the digest represented by the current PCR values) do not match the measurement digest to which hard disk encryption key is sealed.

In accordance with some implementations, a security processor generally refers to any component that performs specified security operations. In accordance with example implementations, the security processor may be a TPM that operates according to a security specification that is defined by the Trusted Computing Group (TCG), such as the Trusted Platform Module Library Specification, Family 2.0, Level 00, Revision 01.59 (November 2019), published by the Trusted Computing Group (hereinafter called the "TPM 2.0 Specification"). In accordance with some implementations, a security processor may be a TPM that operates according to a security specification other than the TPM 2.0 Specification. In accordance with yet further example implementations, the security processor may not operate according to a TCG specification.

A physical, or actual, security processor may be implemented as a physical device using hardware, such as with an integrated circuit (IC) package, or "chip." A "virtual security processor" (such as a vTPM in accordance with example implementations) refers to the emulation of a physical security processor by the execution of machine-readable instructions by a hardware processor (e.g., a hardware processor formed from one or multiple processing cores, such as CPU or GPU cores). Depending on the particular implementation, the machine-readable instructions may be firmware instructions or non-firmware instructions. Regardless of its particular form, a virtual security processor, in accordance with example implementations, has an associated secure memory that may be provisioned with secret or sensitive information, including instance metadata.

Among the features of the vTPM 122, in accordance with example implementations, the vTPM 122 has machine-readable instructions 128 that may be executed by a hardware processor (e.g., a hardware processor formed from one or multiple processing cores, such as CPU or GPU cores of the computer platform 100) for purposes of emulating a physical TPM. As part of this emulation, the vTPM 122 has an emulated TPM interface 124, and the vTPM 122 has an NVRAM. In accordance with example implementations, the NVRAM corresponds to a persistent local cache 132 of the computer platform 100 and a persistent source of trust 174 of the cloud orchestrator 170. The local cache 132 stores an NVRAM image 136 for the vTPM 122, and the NVRAM image 136 contains the instance metadata 140, structured data 147 (e.g., data representing structured data defined by the TPM 2.0 Specification) and unstructured data representing one or multiple other user objects 145 (e.g., objects stored by the machine instance 104, such as seeds, keys, passwords, certificates). In accordance with some implementations, the instance metadata 140 may be considered unstructured data.

In accordance with some implementations, access to the instance metadata 140, may be protected by an access control policy. For example, in accordance with some implementations, the access control policy for the instance metadata 140 may prevent an entity other than the attached machine instance 104 from accessing the instance metadata 140. Moreover, in accordance with some implementations, the instance metadata 140 may be sealed to a particular PCR state, and accessing the instance metadata 140 may involve the use of (and knowledge of) an NV index corresponding to the instance metadata 140.

In accordance with further implementations, one part of the instance metadata 140 may have a different access control policy than another part of the instance metadata. For example, in accordance with some implementations, the user-specific metadata 142 may be sealed to a particular PCR state, but the instance-specific metadata 144 may have an access control policy that is less restrictive and does not involve sealing the metadata 144. In accordance with further implementations, all of the instance metadata 140 may have the same access control policy.

As its name implies, in accordance with example implementations, the local cache 132 is a temporary storage for the NVRAM image 136. Being local to the computer platform 100, the local cache 132 expedites access to the NVRAM data. The local cache 132 may be deleted, or erased, when the vTPM 122 is detached from the machine instance 104. The erasure may be advantageous for security purposes, as sensitive data relating to a machine instance 104 may be removed from the computer platform 100 when the machine instance 104 stops. It is noted that a particular cloud tenant may repeatedly stop and start a machine instance to mitigate cloud expenses. Because the corresponding NVRAM image 178 is maintained as a source of trust 174 by the cloud orchestrator 170, when a stopped machine instance 104 is restarted, the platform's local copy of the NVRAM image may be restored from the NVRAM image 178. Moreover, as further described herein, the NVRAM image 178 may be updated with new instance metadata 140 for purposes of moving, or migrating, a vTPM to another machine instance 104.

For purposes of accessing the vTPM 122, the operating system 116 may contain a TPM driver (not depicted in FIG. 1). The vTPM APIs 118 may be used by components of the machine instance 104, such as applications 114 and the start-up engine 112 to submit requests to the vTPM 122 and receive responses from the vTPM 122.

Figure 2A:
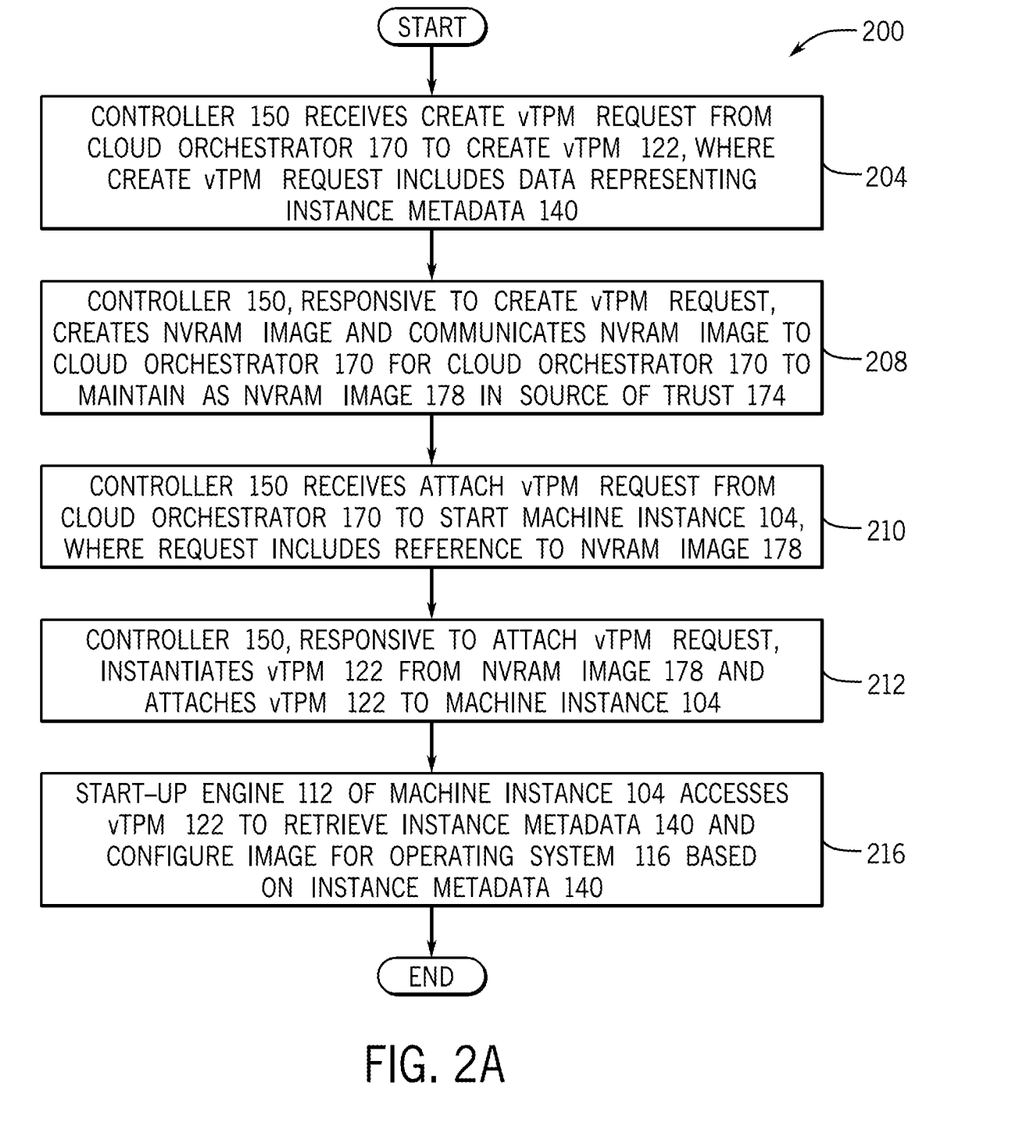
FIG. 2A is a flow diagram depicting a process performed by a controller of the computer platform of FIG. 1 to create a vTPM, provision the vTPM with instance metadata and attach the vTPM to a machine instance according to an example implementation.

FIG. 2A depicts a process 200 performed by the controller 150 to create a vTPM 122, provision the vTPM 122 with instance metadata 140 and attach the vTPM 122 to a machine instance 104 according to an example implementation. Referring to FIG. 2A in conjunction with FIG. 1, the controller 150 receives (block 204) a "Create vTPM Request" from the cloud orchestrator 170 to create a vTPM 122. The Create vTPM Request includes the instance metadata 140 or data from which the instance metadata 140 may be derived. Pursuant to block 204, the controller 150, responsive to the Create vTPM Request, creates a NVRAM image and communicates the NVRAM image to the cloud orchestrator 170 for the cloud orchestrator 170 to maintain the NVRAM image as a source of trust 174.

As depicted in block 210, as part of the process 200, the controller 150 receives an "Attach vTPM Request" from the cloud orchestrator to start a machine instance 104. The Attach vTPM Request includes a reference to the NVRAM image 178. The controller 150, responsive to the Attach vTPM Request, instantiates the vTPM 122 from the NVRAM image 178 and attaches the vTPM 122 to the machine instance 104. With the provisioned vTPM 122 in place, the start-up engine 112 of the machine instance 104 may then access the vTPM 122 to retrieve the instance metadata 140 and configure the image for the operating system 116 based on the instance metadata 140, as depicted in block 216.

Figure 2B:
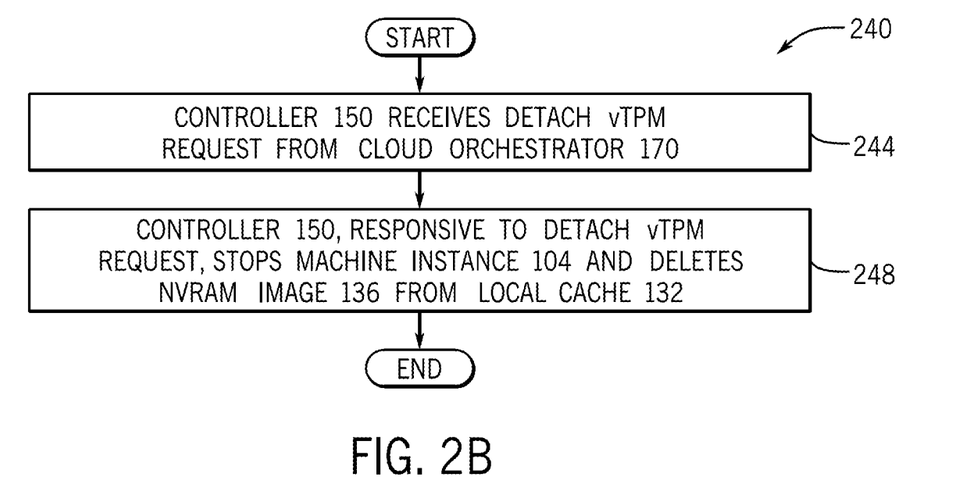
FIG. 2B is a flow diagram depicting a process performed by the controller of the computer platform of FIG. 1 to detach a vTPM from a machine instance according to an example implementation.

FIG. 2B depicts a process 240 performed by the controller 150 to detach a vTPM 122 from a machine instance 104 according to an example implementation. Referring to FIG. 2B in conjunction with FIG. 1, pursuant to block 244, the controller 150 receives a "Detach vTPM Request" from the cloud orchestrator 170. The Detach vTPM Request may include a reference to the particular machine instance 104 and may include a reference to the vTPM 122. The controller 150, responsive to the Detach vTPM Request, stops (block 248) the machine instance 104 and deletes the NVRAM image 136 from the local cache 132.

Figure 2C:
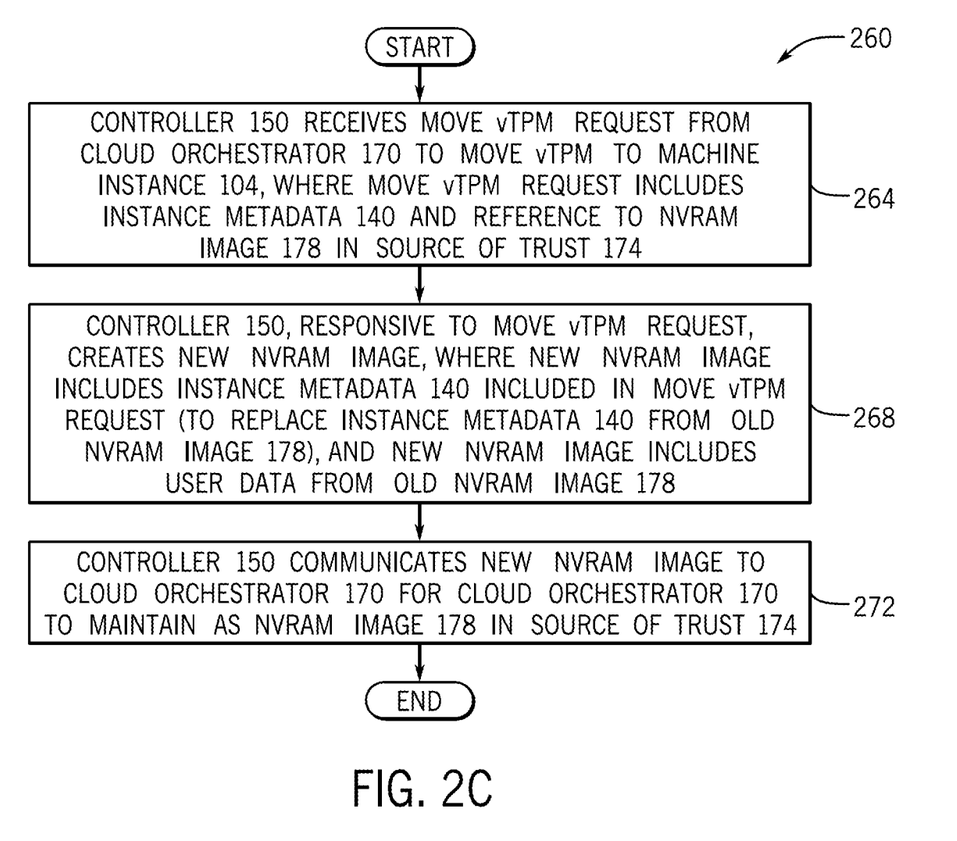
FIG. 2C is a flow diagram depicting a process performed by the controller of the computer platform of FIG. 1 to move a vTPM from one machine instance to another machine instance and attach the vTPM to the other machine instance according to an example implementation.

FIG. 2C depicts a process 260 performed by the controller 150 to migrate a vTPM 122 from one machine instance 104 to another machine instance 104 according to an example implementation. Referring to FIG. 2C in conjunction with FIG. 1, pursuant to the process 260, the controller 150 receives a "Move vTPM Request" from the cloud orchestrator 170 to move a vTPM to a machine instance 104 (block 264). The Move vTPM Request includes instance metadata 140 (or data from which the instance metadata 140 may be derived) and a reference to an NVRAM image 178. Pursuant to block 268, the controller 150, responsive to the Move vTPM Request, creates a new NVRAM image. The new NVRAM image includes the instance metadata 140 associated with the Move vTPM Request, i.e., this new instance metadata 140 replaces the instance metadata 140 from the old NVRAM image 178. The new NVRAM image includes user data from the old NVRAM image 178. The controller 150 then, pursuant to block 272, communicates the new NVRAM image to the cloud orchestrator 170 for the cloud orchestrator 170 to maintain as an NVRAM image 178 in a source of trust 174.

Figure 3:
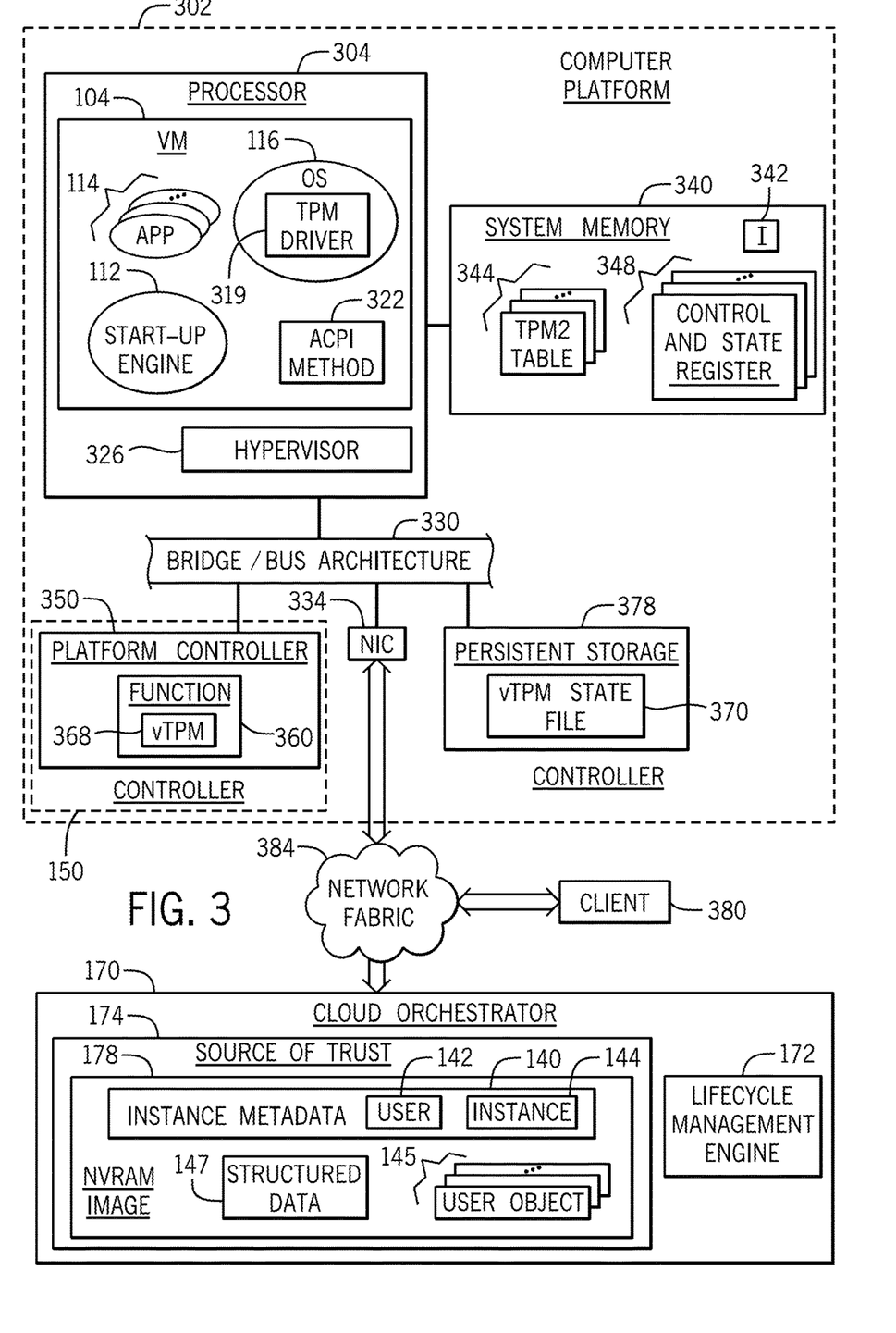
FIG. 3 is schematic diagram of a computer platform having a platform controller to provide vTPMs, attach the vTPMs to virtual machine instances and manage the lifecycles of the vTPMs according to an example implementation.

FIG. 3 depicts a computer platform 302 in accordance with an example implementation. In FIG. 3, similar reference numerals are used to refer to similar components that are described above. Referring to FIG. 3, the computer platform 302 may be connected by network fabric 384 to the cloud orchestrator 170 and to one or multiple clients 380 (e.g., client computer platforms associated with one or multiple cloud tenants). In general, the network fabric 384 may be associated with one or multiple types of communication networks, such as (as examples) Fibre Channel networks, Gen-Z fabrics, dedicated management networks, local area networks (LANs), wide area networks (WANs), global networks (e.g., the Internet), wireless networks, or any combination thereof.

For the example implementation that is depicted in FIG. 3, the controller 150 includes a platform controller 350, and the machine instance is a virtual machine instance 104. A "platform controller" can refer to a controller that performs specified tasks in a computer system. In some examples, the platform controller 350 may be a peripheral bus device, such as a bus device that is coupled to a Peripheral Component Interconnect express (PCIe) bus. In other examples, the platform controller can be a bus device connected to another type of bus in a system. A "bus" refers to a communication link over which multiple devices can communicate with one another. As depicted in FIG. 3, the platform controller 350 may be coupled to a bus/bridge architecture 330. Here, the "bus/bridge architecture" represents one or multiple buses and possibly one or multiple bridges establishing communications between buses.

The platform controller 350, in accordance with example implementations, performs TPM emulation to provide one or multiple vTPMs 368. In this context, providing vTPMs refers to managing the lifecycles of the vTPMs. In accordance with example implementations, the platform controller 350 may manage the lifecycles of the vTPMs. As examples, managing the lifecycle of the vTPM may include managing any aspect of the lifecycle, such as, for example, creating a vTPM 368, provisioning a vTPM 368 with instance metadata, attaching a vTPM 368 to a machine instance, such as a virtual machine instance 104; detaching a vTPM 368 from a machine instance; deleting a vTPM 368; migrating a vTPM 368 to another machine instance; and so forth.

For the example implementation that is depicted in FIG. 3, the computer platform 302 includes a hypervisor 326 for purposes of managing the lifecycles of the virtual machine instances 104. In this manner, the hypervisor 326 may, as examples, create virtual machine instances 104, manage the executions of the virtual machine instances 104, emulate physical resources of the computer platform 302, which are accessible by the virtual machine instances 104, provide isolation among the virtual machine instances 104, and perform other virtualization tasks.

In accordance with example implementations, the platform controller 350 may be part of the hypervisor 326 and provide vTPMs as an emulation device. In accordance with further example implementations, the platform controller 350 may not be part of the hypervisor 326, and the platform controller 350 may be separate and distinct from a hardware processor 304 of the computer platform 302. In this context, a "hardware processor" represents one of multiple processing cores that execute machine-readable instructions. The hardware processor may include one or multiple microprocessors, one or multiple processing cores of a multi-core microprocessor, a microcontroller, a digital signal processor, and so forth.

The hardware processor 304 is coupled to the bridge/bus architecture 330. The hardware processor 304 executes machine-readable instructions 342, which may be stored in system memory 340 of the computer platform 302, which is coupled to the hardware processor 304. The execution of the machine-readable instructions 342 may form software components of the computer platform 302, such as the hypervisor 326, the virtual machine instances 104, a host operating system (if present), as well as other programs (including software programs and/or firmware programs). The system memory 340 may include a memory device or multiple memory devices to store data and machine-readable instructions. A memory device may include a volatile memory device such as a dynamic random access memory or DRAM device, a static random access memory or SRAM device, and so forth. Alternatively, a memory device may include a nonvolatile memory device. Although not shown, the system memory 340 may include a memory controller, or alternatively, a memory controller may be connected to the memory device(s) to control access of data in the memory device(s).

Other devices can also be connected to the bus architecture 330, including a network interface controller (NIC) 334 and a persistent storage 378. The NIC 334 is able to communicate over a network, such that components of the computer platform 302, including the virtual machine instances 104, are able to communicate with other entities over the network through the NIC 334. In further examples, a physical TPM may also be connected to the bus architecture 330. In accordance with example implementations, NIC 334 may be a "smart I/O peripheral" (e.g., a smart network interface controller, or "smart NIC"), which refers to a peripheral that offloads processing operations that were traditionally performed by main processing cores of legacy computer systems. For example, a given smart I/O peripheral may provide backend I/O services for the computer platform 302. As examples, the I/O services may include network virtualization services (e.g., overlay network services, virtual switching services, virtual routing services and network function virtualization services); network storage services; networking monitoring services; storage acceleration services (e.g., non-volatile memory express (NVMe)-based services); security services (e.g., cryptography services and network firewall services); and so forth. In accordance with example implementations, the platform controller 350 may be a smart NIC (e.g., a PCIe-based smart NIC).

The persistent storage 378 can store data that persists even if power is removed from the computer platform 100 or the persistent storage 378. The persistent storage 378 can be implemented using a nonvolatile storage device (or multiple nonvolatile storage devices). A nonvolatile storage device can include a flash memory device, a disk-based storage device, and so forth. In accordance with example implementations, the persistent storage 378 stores a vTPM state file 370, which corresponds to the NVRAM image 136 (see FIG. 1) for a given vTPM.

In accordance with example implementations, the platform controller 350 may emulate a vTPM 368 using a PCI function 360 that is provided by the platform controller 350. It is noted that a hardware TPM is a non-PCI device. When a hypervisor creates an emulated virtual TPM device, the hypervisor emulates a hardware TPM device as a non-PCI device. As described herein, in accordance with example implementations, the platform controller 350 may create multiple emulated hardware TPM devices to provide corresponding vTPMs 368 (or "vTPM devices") using PCI single root I/O virtualization (SR-IOV), as defined by the PCI Special Interest Group (PCI-SIG). In accordance with example implementions, the hypervisor 326 can assign a PCI function 360 (or multiple PCI functions 360) to a given virtual machine instance 104 for purposes of attaching the vTPM 368 to the virtual machine instance 104.

In accordance with example implementations, the PCI function 360 may be a virtual function (VF) that is according to the PCI SR-IOV. The SR-IOV allows a PCIe device (such a vTPM 368 provided by platform controller 350) to present itself to a host (e.g., the computer platform 100) as multiple distinct virtual devices. In accordance with example implementations, the platform controller 350 implements a PCIe physical function (PF) that is partitioned into multiple VFs, where each VF may correspond to a different vTPM 368. The PF provides control over the creation and allocation of VFs. The PF contains an SR-IOV capability structure and manages the SR-IOV functionality. The PF can be discovered, managed, and manipulated like any other PCIe device in the computer platform 100.

In accordance with further implementations, the function 360 may be a function other than a VF. In accordance with some implementations, each VF contains a corresponding vTPM 368.

Among its other features, the platform controller 350 may include a hardware processor and a memory. In this manner, the processor of the platform controller 350 may execute machine-readable instructions that are stored in the memory to perform tasks of the platform controller 350, which are described herein.

In accordance with some implementations, the hypervisor 326 is able create multiple vTPMs 368, which are contained in respective VFs partitioned from the PF implemented by the platform controller 350.

In some examples, the hypervisor 326 creates a vTPM 368 on demand for a respective virtual machine instance 104 (i.e., the vTPM 368 is not created for the virtual machine instance 104 until a virtual machine instance 104 or another entity, such as the cloud orchestrator 170, requests the creation of the vTPM 368). In other examples, the hypervisor 326 creates corresponding vTPMs as virtual machine instances 104 are created.

In accordance with example implementations, each vTPM 368 can support a unique and separate data path for I/O-related functions (e.g., TPM reads and writes) within the PCIe hierarchy. Moreover the vTPMs 368 share the platform controller's underlying hardware and PCIe interface to the PCI bus.

In accordance with example implementations, SR-IOV enables TPM accesses by virtual machine instances 104 to bypass an emulation layer in the hypervisor 326. VFs according to SR-IOV are lightweight so that a large number of VFs can be implemented in the platform controller 350. For example, if the computer platform 100 includes a large number of virtual machine instances 104, a corresponding large number of VFs can be implemented on the platform controller 350 to perform TPM emulation for the respective virtual machine instances 104.

The platform controller 350, in accordance with example implementations, presents a control area 348 for each vTPM 368, which is mapped into the address space of the system memory 340. The control area 348 corresponds to control and status registers used to allow interaction between a virtual machine instance 104 and the vTPM 368. According to the TPM 2.0 Specification, access of a TPM can be performed by reads and writes to arbitrarily specified addresses. Such reads and writes include reads and writes of the registers and memory buffers associated with the control area 348 of the vTPM 368.

The virtual machine instance 104 may be associated with a set of Advanced Configuration and Power Interface (ACPI) tables as well as one or multiple ACPI methods 322, which can be provided by the hypervisor 326. ACPI tables are used to store information relating to ACPI operations, including any or some combination of discovering and configuring hardware components, performing power management, performing status monitoring of components, and other operations. An ACPI method refers to a routine including machine-readable instructions that can be invoked to perform ACPI operations.

One of the ACPI tables that can be associated with a virtual machine instance 104 is a TPM2 table 344. FIG. 3 depicts TPM2 tables 344 for respective vTPMs 368, in accordance with example implementations. As depicted in FIG. 3, the TPM2 tables 344 may be stored in the system memory 340. Moreover, the TPM2 tables 344 may be mapped into the memory address space of respective control areas 348. The addresses stored in the TPM2 tables 344 may be programmed by the hypervisor 326.

Note that the addresses contained in the respective TPM2 tables 344 can be logical addresses (instead of physical addresses) of the respective control areas 348. The hypervisor 326 can provide mapping information (not shown) to map the logical addresses in the TPM2 tables 348 to respective physical addresses that identify the locations of the respective control areas 348. The mapping information to map the logical addresses to the physical address can be in the form of a memory management unit (MMU) table associated with the processor 304, for example. The mapping information can have other forms in other examples.

Note that the logical addresses may be the same logical address, except that they are mapped to different physical addresses by the mapping information. Alternatively, the logical addresses may be different logical addresses.

In accordance with example implementations, the platform controller 350 may emulate vTPMs, as described in U.S. Patent Application Publication Number 2021/0271502, entitled "VIRTUAL TRUSTED PLATFORM MODULES."

The platform controller 350 may be formed from hardware other than hardware of a PCIe peripheral, in accordance with further implementations. For example, in accordance with some implementations, the platform controller 350 may be a chassis management controller.

As another example, in accordance with further implementations, the platform controller 350 may be a baseboard management controller, or "BMC." A baseboard management controller is a specialized service processor that monitors the physical state of a server or other hardware using sensors and communicates with a management system through a management network. The baseboard management controller may also communicate with applications executing at the operating system level through an input/output controller (IOCTL) interface driver, a representational state transfer (REST) API, or some other system software proxy that facilitates communication between the baseboard management controller and applications. The baseboard management controller may have hardware level access to hardware devices that are located in a server chassis including system memory. The baseboard management controller may be able to directly modify the hardware devices. The baseboard management controller may operate independently of the operating system of the system in which the baseboard management controller is disposed. The baseboard management controller may be located on the motherboard or main circuit board of the server or other device to be monitored. The fact that a baseboard management controller is mounted on a motherboard of the managed server/hardware or otherwise connected or attached to the managed server/hardware does not prevent the baseboard management controller from being considered "separate" from the server/hardware. As used herein, a baseboard management controller has management capabilities for sub-systems of a computing device, and is separate from a processing resource that executes an operating system of a computing device. The baseboard management controller is separate from a processor, such as a central processing unit, which executes a high-level operating system or hypervisor on a system.

In accordance with yet further example implementations, the controller 150 may be a software component that is formed from main, general purpose processing cores of the computer platform executing machine-readable instructions. For example, as noted above, in accordance with some implementations, the controller 150 may be a hypervisor, such as the hypervisor 360 that is depicted in FIG. 3.

Figure 4:
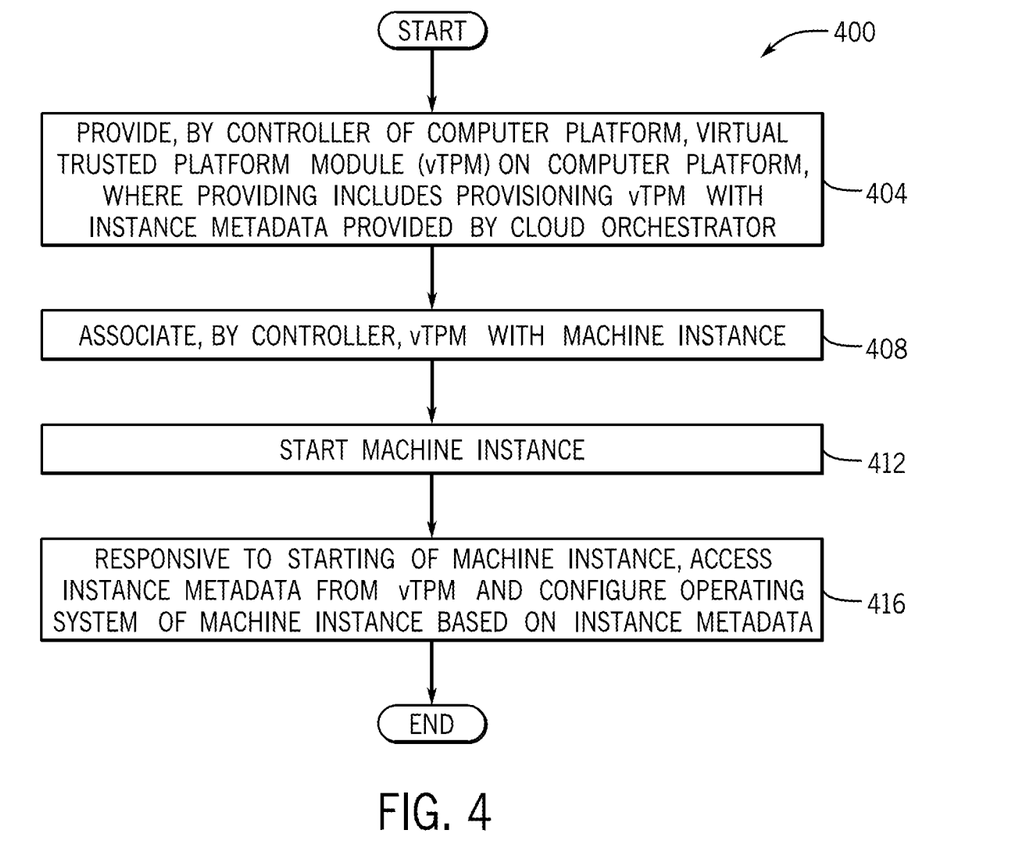
FIG. 4 is a flow diagram depicting a process to configure an operating system of a machine instance using instance metadata stored in a vTPM according to an example implementation.

Referring to FIG. 4, in accordance with example implementations, a process 400 includes providing (block 404), by a controller of a computer platform, a virtual trusted platform module (vTPM) on the computer platform. The providing includes provisioning the vTPM with instance data provided by a cloud orchestrator. The process 400 includes associating (block 408), by the controller, the vTPM with a machine instance. The process 400 includes starting (block 412) the machine instance. Pursuant to block 416, the process 400 includes responsive to the starting of the machine instance, accessing the instance metadata from the vTPM and configuring an operating system image of the machine instance based on the instance metadata.

Figure 5:
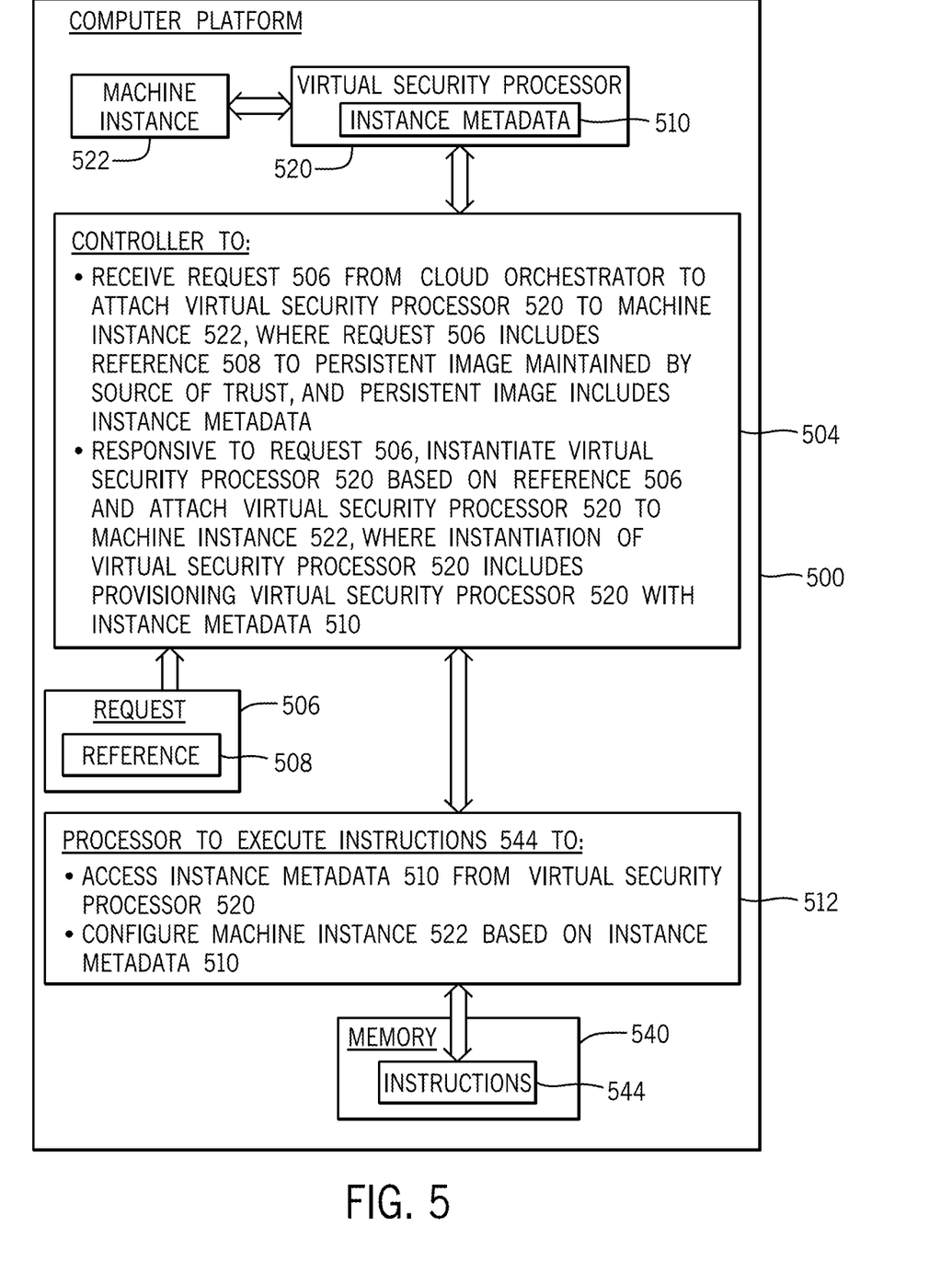
FIG. 5 is a schematic diagram of a computer platform having a controller to instantiate a virtual security processor, attach the virtual security processor to a machine instance and provision the virtual security processor with instance metadata according to an example implementation.

Referring to FIG. 5, in accordance with example implementations, a computer platform 500 includes a controller 504, a processor 512 and a memory 540. The controller 504 receives a request 506 from a cloud orchestrator to attach a virtual security processor 520 to a machine instance 522. The request 506 includes a reference 508 to a persistent image maintained by a source of trust, and the persistent image includes instance metadata 510. The controller 504, responsive to the request 506, instantiates the virtual security processor 520 based on the reference 508 and attaches the virtual security processor 520 to the machine instance 522. The instantiation of the virtual security processor 520 includes provisioning the virtual security processor 520 with the instance metadata 510. The memory 540 stores instructions 544, that, when executed by the processor 512, cause the processor 512 to access the instance metadata 510 from the virtual security processor 520, and configure the machine instance 522 based on the instance metadata 510.

Figure 6:
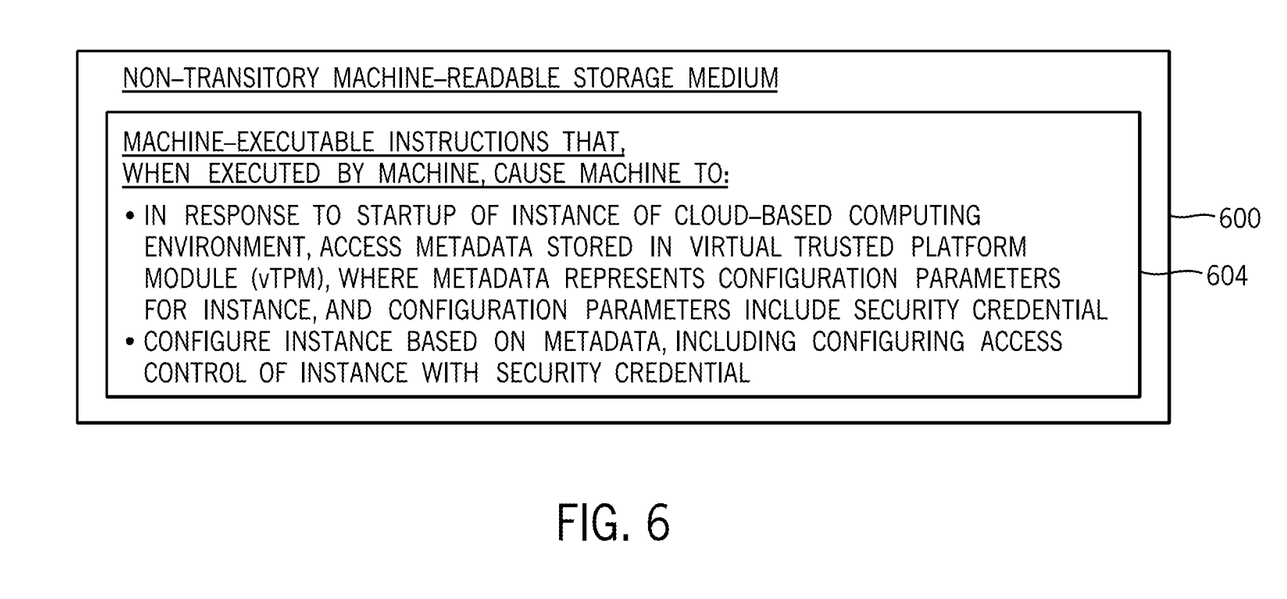
FIG. 6 is an illustration of a non-transitory machine-readable storage medium storing machine-executable instructions that, when executed by a machine, cause the machine to configure an instance of a cloud-based computing environment by accessing metadata that is stored in a vTPM according to an example implementation.

Referring to FIG. 6, in accordance with example implementations, a non-transitory machine-readable storage medium 600 stores machine-executable instructions 604 that, when executed by a machine, cause the machine to, in response to a start-up of an instance of a cloud-based computing environment, access metadata that is stored in a virtual trusted platform module (vTPM). The metadata represents configuration parameters for the instance, and the configuration parameters include a security credential. The instructions 604, when executed by the machine, further cause the machine to configure the instance based on the metadata. This configuration includes configuring an access control of the instance with the security credential.

In accordance with example implementations, configuring the operating system image includes configuring the operating system image with a user credential that is represented by the metadata, and configuring the operating system image with information that is specific to the machine instance. A particular advantage is that sensitive information in the instance metadata is highly resistant to security attacks.

In accordance with example implementations, providing the vTPM includes creating, by the controller, the vTPM responsive to the controller receiving a request from the cloud orchestrator to create the vTPM. The request includes data representing the instance metadata. Providing the vTPM further includes creating a persistent memory image based on the instance metadata. The persistent memory image corresponds to the vTPM. Providing the vTPM further includes communicating the persistent memory image to the cloud orchestrator for the cloud orchestrator to maintain as a source of trust, and creating a cache on the computer platform to store a copy of the persistent memory image. A particular advantage is that sensitive information in the instance metadata is highly resistant to security attacks.

In accordance with example implementations, responsive to a request from the cloud orchestrator to stop the machine instance, the controller stops the machine instance and the controller deletes the cache. A particular advantage is that sensitive information in the instance metadata is highly resistant to security attacks.

In accordance with example implementations, providing the vTPM includes the controller moving the vTPM from another machine instance, and the provisioning includes the controller updating a persistent memory image associated with the vTPM. A particular advantage is that sensitive information in the instance metadata is highly resistant to security attacks.

In accordance with example implementations, provisioning the vTPM with the instance metadata further includes establishing at least one of an access control or an access policy for accessing the instance metadata. A particular advantage is that sensitive information in the instance metadata is highly resistant to security attacks.

In accordance with example implementations, the establishing of the access control and/or access policy includes associating the instance metadata with an index value and sealing the instance metadata to a platform configuration register state. A particular advantage is that sensitive information in the instance metadata is highly resistant to security attacks.

In accordance with example implementations, the controller may be a platform controller, a hypervisor, or a baseboard management controller. A particular advantage is that sensitive information in the instance metadata is highly resistant to security attacks.

In accordance with example implementations, the machine instance may be a virtual machine instance or a bare metal instance. A particular advantage is that sensitive information in the instance metadata is highly resistant to security attacks.

In accordance with example implementations, responsive to the starting of the machine instance, a start-up script is executed to access the instance metadata from the vTPM and configure an operating system image of the machine instance based on the instance metadata. A particular advantage is that sensitive information in the instance metadata is highly resistant to security attacks.

In accordance with example implementations, the controller receives a request from the cloud orchestrator to start the machine instance. The request includes a reference to a source of trust, and the source of trust includes a persistent image that includes the instance metadata. Responsive to the request, the controller instantiates the vTPM, provisions the vTPM with the persistent image, and attaches the vTPM to the machine instance. A particular advantage is that sensitive information in the instance metadata is highly resistant to security attacks.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A non-transitory machine-readable storage medium that stores machine-executable instructions that, when executed by a machine, cause the machine to:
    in response to a start-up of an instance of a cloud-based computing environment, access metadata stored in a virtual trusted platform module (vTPM), wherein the metadata represents configuration parameters used to configure an operating system image of the instance with a security credential that allows a user to securely communicate with the instance; and
    configure the operating system image based on the metadata to allow the user to use the security credential to securely communicate with the instance.

2. The storage medium of claim 1, wherein the instructions, when executed by the machine, further cause the machine to communicate with a cloud orchestrator to manage the vTPM.

3. The storage medium of claim 2, wherein the management of the vTPM comprises at least one of creating the vTPM, attaching the vTPM to the instance, detaching the vTPM from the instance, deleting the vTPM or moving the vTPM to another instance.

4. A method comprising:
providing, by a controller of a computer platform, a virtual trusted platform module (vTPM) on the computer platform, wherein the providing comprises provisioning the vTPM with instance metadata provided by a cloud orchestrator, wherein the instance metadata being used to configure an operating system image of a machine instance with user-specific information that allows a user to securely communicate with the machine instance;
associating, by the controller, the vTPM with the machine instance;
starting, by the controller, the machine instance; and
responsive to the starting of the machine instance, accessing the instance metadata from the vTPM and configuring the operating system image based on the instance metadata to enable the user to securely communicate with the machine instance.

5. The method of claim 4, wherein the user-specific information comprises a user credential, and configuring the operating system image comprises configuring the operating system image with the user credential and configuring the operating system image with information specific to the machine instance.

6. The method of claim 4, wherein providing the vTPM comprises:
creating, by the controller, the vTPM responsive to the controller receiving a request from the cloud orchestrator to create the vTPM, wherein the request comprises the instance metadata;
creating a persistent memory image based on the instance metadata, wherein the persistent memory image corresponding to the vTPM;
communicating the persistent memory image to the cloud orchestrator for the cloud orchestrator to maintain as a source of trust; and
creating a cache on the computer platform to store a copy of the persistent memory image.

7. The method of claim 6, further comprising:
responsive to a request from the cloud orchestrator to stop the machine instance, the controller stopping the machine instance and the controller deleting the cache.

8. The method of claim 4, wherein providing the vTPM comprises the controller moving the vTPM from another machine instance, and the provisioning comprises the controller updating a persistent memory image associated with the vTPM.

9. The method of claim 4, wherein provisioning the vTPM with the instance metadata further comprises establishing at least one of an access control or an access policy for accessing the instance metadata.

10. The method of claim 9, wherein the establishing comprises at least one of associating the instance metadata with an index value and sealing the instance metadata to a platform configuration register state.

11. The method of claim 4, wherein the controller comprises a platform controller, a hypervisor, or a baseboard management controller.

12. The method of claim 4, wherein the machine instance comprises a virtual machine instance or a bare metal instance.

13. The method of claim 4, further comprising responsive to the starting of the machine instance, executing a start-up script of the computer platform to access the instance metadata from the vTPM and configure the operating system image based on the instance metadata.

14. The method of claim 4, further comprising:
receiving, by the controller, a request from the cloud orchestrator to start the machine instance, wherein the request includes a reference to a source of trust, and the source of trust comprises a persistent image that includes the instance metadata; and
responsive to the request, the controller instantiating the vTPM, provisioning the vTPM with the persistent image, and attaching the vTPM to the machine instance.

15. A computer system comprising:
a controller to:
receive a request from a cloud orchestrator to attach a virtual security processor to a machine instance, wherein the request comprises a reference to a persistent image maintained by a source of trust, and the persistent image includes instance metadata, wherein the instance metadata being used to configure an operating system image of the machine instance with user-specific information that allows a user to securely communicate with the machine instance; and
responsive to the request, instantiate the virtual security processor based on the reference and attach the virtual security processor to the machine instance, wherein the instantiation of the virtual security processor comprises provisioning the virtual security processor with the instance metadata;
a hardware processor; and
a memory to store instructions that, when executed by the hardware processor, cause the hardware processor to:
access the instance metadata from the virtual security processor; and
configure the operating system image based on the instance metadata to enable the user to securely communicate with the machine instance.

16. The computer system of claim 15, wherein the controller comprises at least one of a hypervisor, a platform controller or a baseboard management controller.

17. The computer system of claim 15, wherein the controller to:
receive a request from the cloud orchestrator to create the virtual security processor, wherein the request comprises the instance metadata; and
responsive to the request to create the virtual security processor, the controller creates the persistent image based on the instance metadata and communicates the reference to the cloud orchestrator.

18. The computer system of claim 15, wherein the machine instance comprises a second machine instance, and the controller to:
receive a request from the cloud orchestrator to move the virtual security processor from a first machine instance to the second machine instance, wherein the request comprises the reference and instance metadata corresponding to the second machine instance; and
responsive to the request, the controller creates a second persistent image corresponding to the second machine instance and communicates the second persistent image to the cloud orchestrator to maintain in the source of trust, wherein the second persistent image contains the instance metadata corresponding to the second machine instance.

19. The computer system of claim 18, wherein the second persistent image comprises user data stored in the virtual security processor by the first machine instance.

* * * * *